United States Patent
Kajiwara

(10) Patent No.: US 10,655,588 B2
(45) Date of Patent: May 19, 2020

(54) RESTART CONTROL SYSTEM

(71) Applicant: DENSO CORPORATION, Kariya, Aichi-pref. (JP)

(72) Inventor: Yasuhiro Kajiwara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/306,094

(22) PCT Filed: May 25, 2017

(86) PCT No.: PCT/JP2017/019616
§ 371 (c)(1),
(2) Date: Nov. 30, 2018

(87) PCT Pub. No.: WO2017/208975
PCT Pub. Date: Dec. 7, 2017

(65) Prior Publication Data
US 2019/0162153 A1    May 30, 2019

(30) Foreign Application Priority Data

May 30, 2016    (JP) .................................. 2016-107762

(51) Int. Cl.
*F02N 11/08*    (2006.01)
*B60W 10/08*    (2006.01)
(Continued)

(52) U.S. Cl.
CPC ......... *F02N 11/0825* (2013.01); *B60W 10/08* (2013.01); *F02D 17/00* (2013.01);
(Continued)

(58) Field of Classification Search
CPC ...... F02N 11/0825; F02N 11/08; F02N 11/00; F02N 11/04; F02N 11/0844;
(Continued)

(56) References Cited

U.S. PATENT DOCUMENTS

2002/0050810 A1    5/2002    Taniguchi et al.
2007/0204840 A1    9/2007    Abe

FOREIGN PATENT DOCUMENTS

JP    2001-112282 A    4/2001
JP    2008-019789 A    1/2008
JP    5875664 B1    3/2016

OTHER PUBLICATIONS

Aug. 15, 2017 International Search Report issued in International Patent Application No. PCT/JP2017/019616.

*Primary Examiner* — Hai H Huynh
(74) *Attorney, Agent, or Firm* — Oliff PLC

(57) ABSTRACT

A restart control system includes a rotational angle estimation unit that estimates a rotating electrical machine's rotational angle in a state wherein an internal-combustion engine's rotational speed detected by a rotational speed detection unit is higher than an estimation threshold and configured not to estimate rotating electrical machine's rotational angle in a state wherein internal-combustion engine's rotational speed is lower than estimation threshold; a rotating electrical machine control unit increases internal-combustion engine's rotational speed by rotating electrical machine under condition where predetermined restart conditions are satisfied and rotating electrical machine's rotational angle is estimated by rotational angle estimation unit, thereby restarting the internal-combustion engine; and a starter motor control unit starts driving of a starter motor under a condition where predetermined restart conditions are satisfied and internal-combustion engine's rotational speed falls below a predetermined rotational speed set lower than estimation threshold, thereby increasing internal-combustion engine's rotational speed to estimation threshold.

12 Claims, 3 Drawing Sheets

(51) Int. Cl.
*F02D 29/02* (2006.01)
*F02D 29/06* (2006.01)
*F02D 17/00* (2006.01)
*F02N 11/04* (2006.01)
*F02N 11/00* (2006.01)

(52) U.S. Cl.
CPC ............. *F02D 29/02* (2013.01); *F02D 29/06* (2013.01); *F02N 11/00* (2013.01); *F02N 11/04* (2013.01); *F02N 11/08* (2013.01); *F02N 11/0844* (2013.01); *F02N 2200/048* (2013.01)

(58) Field of Classification Search
CPC .. F02N 2200/048; B60W 10/08; F02D 29/02; F02D 29/06; F02D 17/00
USPC ................ 123/179.3, 179.4, 179.25, 179.28; 701/110, 112, 113; 73/114.25, 114.59
See application file for complete search history.

RESTART CONTROL SYSTEM

CROSS-REFERENCE TO RELATED APPLICATION

This application is the U.S. national phase of International Patent Application No. PCT/JP2017/019616 filed May 25, 2017 which designated the U.S. and claims priority to Japanese Patent Application No. 2016-107762 filed on May 30, 2016, the contents of which are incorporated herein by reference.

TECHNICAL FIELD

The present disclosure relates to a restart control system of an engine.

BACKGROUND ART

In recent years, a vehicle (hereinafter referred to as an □idling stop vehicle□) having an idling stop function for the purpose of, e.g., improvement of fuel consumption, has been in practical use, for example. Instantaneous start-up of an engine is required upon restart after idling stop. For this reason, a control system including a starter motor and a rotating electrical machine and configured to operate the starter motor and the rotating electrical machine in cooperation to start an engine has been proposed as an engine start-up device applied to the idling stop vehicle.

For example, Patent Literature 1 discloses the technique of changing a restart method depending on in which rotational speed range an engine rotational speed falls in a case where an engine is restarted upon satisfaction of predetermined restart conditions during an engine automatic stop period by an idling stop function. Specifically, the rotational speed range is divided into a first rotational speed range where the engine can be restarted only by resuming fuel injection, a second rotational speed range where the engine can be restarted only by a rotating electrical machine (a motor generator), and a third rotational speed range where cranking at an initial restart control stage by a starter motor is necessary. When the predetermined restart conditions are satisfied, a suitable restart method is selected based on in which rotational speed range of the first to third rotational speed ranges the engine rotational speed falls.

CITATION LIST

Patent Literature

[PTL 1] Japanese Patent No. 5875664

SUMMARY OF THE INVENTION

In a case where a torque is provided to a crank shaft by a rotating electrical machine, such as a case where an engine is restarted using the rotating electrical machine, the rotating electrical machine cannot be properly driven as long as the rotational angle of a rotor forming the rotating electrical machine cannot be recognized. Thus, a rotational angle sensor configured to detect the rotational angle of the rotor is often provided at the rotating electrical machine. In a rotating electrical machine not provided with a rotational angle sensor, the rotational angle of the rotating electrical machine needs to be estimated using any method such as the method for estimating the rotational angle of the rotating electrical machine based on the phase voltage of any of stator wirings forming the rotating electrical machine. However, in a case where an engine rotational speed falls in a low rotational speed range, it is often difficult to estimate the rotational angle of the rotating electrical machine. The technique described in Patent Literature 1 fails to describe and suggest such a point, and therefore, is assumed as a technique based on a rotating electrical machine provided with a rotational angle sensor. A case is assumed herein, in which the technique described in Patent Literature 1 is implemented for a vehicle including a rotating electrical machine not provided with a rotational angle sensor and configured such that an estimation lower rotational speed limit set as a lower rotational speed limit for estimating a rotational angle is set higher than the lower limit of the second rotational speed range. In this case, when the engine rotational speed upon satisfaction of the predetermined restart conditions is within a range from the estimation lower rotational speed limit of the rotational angle to the lower limit of the second rotational speed range, the rotational angle of the rotating electrical machine cannot be estimated, and therefore, the rotating electrical machine cannot be normally driven. This leads to a probability that engine restart will fail.

The present disclosure has been made to solve the above-described problems, and a main object of the present disclosure is to provide a restart control system capable of performing proper engine restart control using a rotating electrical machine and a starter motor in combination in the rotating electrical machine including no rotational angle sensor.

A first aspect of the disclosure is a restart control system applied to a vehicle including an internal-combustion engine, a rotating electrical machine capable of performing power generation using torque transmitted from an output shaft of the internal-combustion engine and providing a rotation torque to the output shaft, a starter motor configured to start the internal-combustion engine, a rotational speed detection unit configured to detect the rotational speed of the internal-combustion engine, and an automatic stop restart control function for performing automatic stop and automatic restart of the internal-combustion engine. The restart control system includes a rotational angle estimation unit configured to estimate the rotational angle of the rotating electrical machine in a state in which the rotational speed of the internal-combustion engine detected by the rotational speed detection unit is higher than an estimation threshold and configured not to estimate the rotational angle of the rotating electrical machine in a state in which the rotational speed of the internal-combustion engine is lower than the estimation threshold; a rotating electrical machine control unit configured to increase the rotational speed of the internal-combustion engine using the rotating electrical machine under a condition where predetermined restart conditions are satisfied and the rotational angle of the rotating electrical machine is estimated by the rotational angle estimation unit, thereby restarting the internal-combustion engine; and a starter motor control unit configured to start driving of the starter motor under a condition where the predetermined restart conditions are satisfied and the rotational speed of the internal-combustion engine falls below a predetermined rotational speed set lower than the estimation threshold, thereby increasing the rotational speed of the internal-combustion engine to the estimation threshold.

A second aspect of the disclosure is a restart control system applied to a vehicle including an internal-combustion engine, a rotating electrical machine capable of performing power generation using torque transmitted from an output shaft of the internal-combustion engine and providing a rotation torque to the output shaft, a starter motor configured to start the internal-combustion engine, a rotational speed detection unit configured to detect the rotational speed of the internal-combustion engine, and an automatic stop restart control function for performing automatic stop and automatic restart of the internal-combustion engine. The restart control system includes a rotational angle estimation unit configured to estimate the rotational angle of the rotating electrical machine and incapable of estimating the rotational angle of the rotating electrical machine in a state in which the rotational speed of the internal-combustion engine is lower than an estimation threshold; a rotating electrical machine control unit configured to increase the rotational speed of the internal-combustion engine using the rotating electrical machine under a condition where predetermined restart conditions are satisfied and the rotational angle of the rotating electrical machine is estimated by the rotational angle estimation unit, thereby restarting the internal-combustion engine; and a starter motor control unit configured to start driving of the starter motor under a condition where the predetermined restart conditions are satisfied and the rotational speed of the internal-combustion engine falls below a predetermined rotational speed set lower than the estimation threshold, thereby increasing the rotational speed of the internal-combustion engine to the estimation threshold.

When cranking by the starter motor is started in a state in which the rotational speed of the internal-combustion engine is higher than the predetermined rotational speed, durability of the starter motor might be lowered due to, e.g., friction of a pinion forming the starter motor. Thus, cranking by the starter motor is started in a state in which the rotational speed of the internal-combustion engine falls below the predetermined rotational speed. On the other hand, it is assumed that in the rotating electrical machine having no rotational angle sensor, in a state in which the rotational speed of the internal-combustion engine is lower than the estimation threshold, accuracy for estimating the rotational angle of the rotating electrical machine is lowered or the rotational angle of the rotating electrical machine cannot be estimated. As long as the rotational angle of the rotating electrical machine cannot be accurately recognized, the rotating electrical machine cannot be properly driven. For this reason, in a state in which the rotational speed of the internal-combustion engine is lower than the estimation threshold, there is a probability that the rotation torque cannot be provided to the output shaft by the rotating electrical machine.

Based on the above, it is assumed that the estimated threshold is set higher than the predetermined rotational speed. In a case where the predetermined restart conditions are satisfied and the rotational speed of the internal-combustion engine is within a range from the estimation threshold to the predetermined rotational speed, it is difficult to estimate the rotational angle of the rotating electrical machine with high accuracy. For this reason, no torque is provided to the output shaft of the internal-combustion engine by the rotating electrical machine. Moreover, a problem leading to lowering of the durability of the starter motor might be caused. For this reason, no cranking by the starter motor is performed either. That is, in this situation, no attempt is made to perform the control of increasing the rotational speed of the internal-combustion engine by means of the rotating electrical machine or the starter motor until the rotational speed of the internal-combustion engine falls below the predetermined rotational speed. Accordingly, the rotational speed of the internal-combustion engine falls below the predetermined rotational speed. Driving of the starter motor is started under a condition where the rotational speed of the internal-combustion engine falls below the predetermined rotational speed, and the rotational speed of the internal-combustion engine is thereby increased to the estimation threshold. Then, the rotational speed of the internal-combustion engine increased by cranking of the starter motor is further increased by the torque provided to the output shaft of the internal-combustion engine by the rotating electrical machine, and restart of the internal-combustion engine is performed. In this manner, in the rotating electrical machine including no rotational angle sensor, proper engine restart control using the rotating electrical machine and the starter motor in combination can be performed.

A third aspect of the disclosure is the restart control system according to the first or second aspect of the disclosure, in which in a case where the predetermined restart conditions are satisfied and the rotational speed of the internal-combustion engine detected by the rotational speed detection unit is within the range from the estimation threshold to the predetermined rotational speed, the rotating electrical machine control unit causes the rotating electrical machine to perform power generation.

In a case where the rotational speed of the internal-combustion engine detected by the rotational speed detection unit is within the range from the estimation threshold to the predetermined rotational speed, the torque cannot be provided to the output shaft of the internal-combustion engine by the rotating electrical machine, and cranking by the starter motor cannot be performed. Thus, in a case where the predetermined restart conditions are satisfied in this situation, power generation is performed by the rotating electrical machine to provide a load to the output shaft of the internal-combustion engine, thereby quickly decreasing the rotational speed of the internal-combustion engine to the predetermined rotational speed. In this manner, a period until the internal-combustion engine is actually restarted until the predetermined restart conditions have been satisfied can be shortened, and restart properties can be improved.

A fourth aspect of the disclosure is the restart control system according to the first or second aspect of the disclosure, in which in a case where predetermined automatic stop conditions are satisfied, the rotating electrical machine control unit causes the rotating electrical machine to perform power generation.

In a case where the predetermined automatic stop conditions are satisfied, the rotating electrical machine may perform power generation to provide the load to the output shaft of the internal-combustion engine. In this case, the rate of decrease in the rotational speed of the internal-combustion engine can be increased at an earlier stage. Thus, the restart properties of the internal-combustion engine can be improved in a case where the restart conditions are satisfied and the rotational speed of the internal-combustion engine is within the range from the estimation threshold to the predetermined rotational speed. In addition, quick passage through a resonance rotational speed range where vibration might occur due to resonance of the internal-combustion engine is enabled. Thus, vibration of the internal-combustion engine can be reduced.

A fifth aspect of the disclosure is the restart control system according to the third or fourth aspect of the disclosure, in which in a case where the rotational speed of the internal-combustion engine falls below the predetermined rotational speed, the rotating electrical machine control unit terminates power generation performed by the rotating electrical machine in a case where the predetermined restart conditions are satisfied.

In a case where the rotational speed of the internal-combustion engine is lower than the predetermined rotational speed, power generation performed by the rotating electrical machine in a case where the predetermined restart conditions are satisfied is terminated. Thus, power generation by the rotating electrical machine is terminated when cranking by the starter motor is started, and therefore, the rotational speed of the internal-combustion engine can be smoothly increased.

BRIEF DESCRIPTION OF THE DRAWINGS

The above-described object of the present disclosure and other objects, features, and advantageous effects will be more apparent from detailed description below with reference to attached drawings. The drawings are.

DESCRIPTION OF EMBODIMENTS

Figure 1:
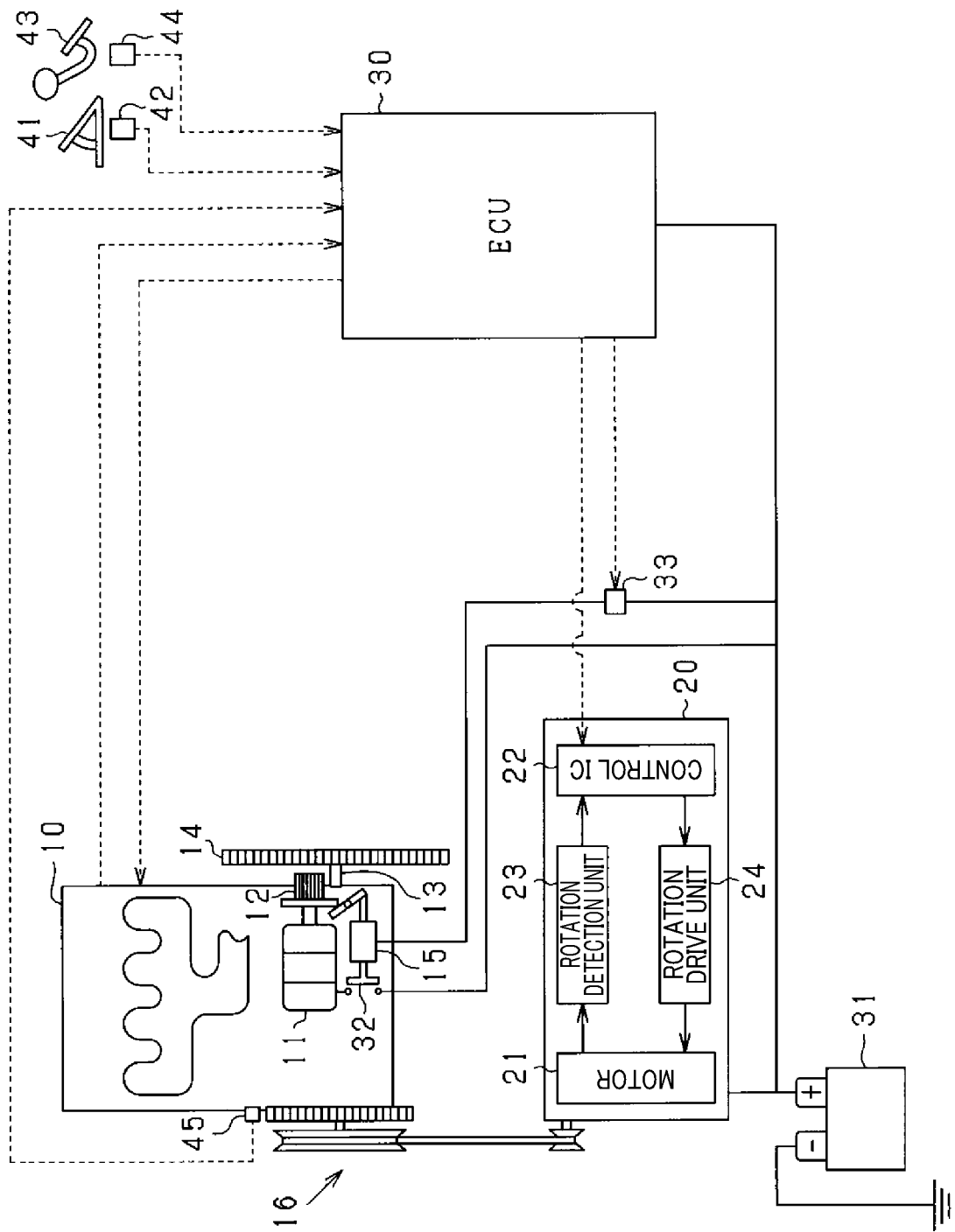
FIG. 1 is a schematic configuration diagram of a control system according to the present embodiment.

Hereinafter, the present embodiment for embodying the present disclosure will be described with reference to the drawings. A control system according to the present embodiment is mounted on a vehicle including an engine 10 as a drive source for travelling. In FIG. 1, the engine 10 is a multi-cylinder internal-combustion engine driven by combustion of fuel such as gasoline or light oil, and as known, includes a fuel injection valve, an ignition device, etc.

A starter motor 11 is provided at the engine 10. A pinion 12 is provided at a rotary shaft of the starter motor 11, and is provided joinable to a ring gear 14 provided at a rotary shaft 13 of the engine 10. A solenoid 15 configured to push the pinion 12 to engage the pinion 12 to the ring gear 14 is provided at the starter motor 11. The solenoid 15 is driven as a drive unit of the pinion 12. Upon start-up of the engine 10, the pinion 12 moves in an axial direction by driving of the solenoid 15 to engage with the ring gear 14, and therefore, power of the starter motor 11 can be transmitted to the rotary shaft 13 of the engine 10.

A rotating electrical machine 20 is connected to the rotary shaft 13 of the engine 10 through a power transmission unit 16 including a pulley and a belt, and therefore, power can be transmitted. The rotating electrical machine 20 is driven as an electric motor when drive force is supplied to the rotary shaft 13 of the engine 10, and is driven as a generator when drive force of the engine 10 is converted into power. In the present embodiment, the rotating electrical machine 20 is assumed to be an integrated starter generator (ISG). Note that the rotating electrical machine 20 is not limited to an ISG. The rotating electrical machine 20 may be sandwiched between the rotary shaft 13 of the engine 10 and a transmission (not shown), and may be directly driven by the rotary shaft 13 or may directly drive the rotary shaft 13.

The rotating electrical machine 20 includes a motor 21, a control IC 22, a rotation detection unit 23, and a rotation drive unit 24. The motor 21 is a three-phase AC motor, and has a well-known configuration including a stator having three-phase stator windings and a rotor having a field winding. The rotation drive unit 24 is a well-known inverter circuit including multiple MOSFETs as switching elements, and has the function of converting DC power supplied from a battery 31 into AC power to supply the AC power to the motor 21 and the function of converting AC power supplied from the motor 21 into DC power to supply the DC power to the battery 31.

The control IC 22 is a control unit configured to control the rotating electrical machine 20. In a case where the rotating electrical machine 20 is driven as the electric motor, the control IC 22 drives the rotation drive unit 24 to convert the DC power supplied from the battery 31 into three-phase power, thereby supplying the three-phase power to the stator.

In this state, the rotation detection unit 23 is configured to detect the phase voltage (e.g., the V-phase voltage) of any of the stator windings. The detected V-phase voltage is binarized relative to a predetermined reference voltage, and in this manner, a pulse signal is generated and output to the control IC 22. The control IC 22 counts, for a predetermined period, the number of pulses of the pulse signal output by the rotation detection unit 23. The number of pulses of the pulse signal depends on the rotational speed of the motor 21, and therefore, the rotational speed of the motor 21 can be obtained from the number of pulses of the pulse signal within the predetermined period. The control IC 22 controls the rotation drive unit 24 such that the rotational speed of the motor 21 obtained as described above reaches a target rotational speed.

In a case where the rotating electrical machine 20 is driven as the generator, AC induced electromotive force is generated at the stator. The frequency of the AC induced electromotive force depends on the rotational speed of the motor 21. Thus, the induced electromotive force is detected by the rotation detection unit 23 so that the rotational speed of the motor 21 can be obtained.

Further, the rotation detection unit 23 can estimate a rotational angle from inductive voltage and inverse electromotive force generated at the rotor or the stator. Thus, the rotation detection unit 23 corresponds to a rotational angle estimation unit. The rotation detection unit 23 according to the present embodiment estimates the rotational angle of the rotor in a state in which an engine rotational speed is higher than an estimation threshold, but does not estimate the rotational angle of the rotor in a state in which the engine rotational speed is lower than the estimation threshold. Reasons will be described later.

Note that a drive wheel is connected to the rotary shaft 13 of the engine 10 through a not-shown clutch, a not-shown transmission, etc. This configuration is well-known, and therefore, specific description will not be made.

In the present system, an ECU 30 is provided as a main control device configured to control the entirety of the system. The ECU 30 is a well-known electronic control device including a microcomputer etc.

The ECU 30 is electrically connected to the battery 31, and is operated by power supplied from the battery 31. The battery 31 is connected to the starter motor 11, and is connected to the solenoid 15 through a relay 33. The relay 33 is brought into a connection state by a drive signal from the ECU 30. A switch 32 is brought into a connection state such that the starter motor 11 is brought into a rotation state by the power supplied from the battery 31, and is brought into a disconnection state such that power supply from the battery 31 is stopped to bring the starter motor 11 into a non-drive state. The relay 33 is brought into the connection state, and accordingly, the solenoid 15 is driven by the power supplied from the battery 31 to push the pinion 12 to engage the pinion 12 with the ring gear 14. After the pinion 12 has been pushed, the switch 32 is turned ON, and the starter motor 11 starts cranking. By disconnection of the relay 33, power supply from the battery 31 is stopped, and the switch 32 is turned OFF in the course of returning the solenoid 15 to an original position before operation. After the non-drive state has been brought, engagement between the pinion 12 and the ring gear 14 is canceled.

Thus, the ECU 30 corresponds to a starter motor control unit. Moreover, the control IC 22 and the ECU 30 correspond to a rotating electrical machine control unit.

Sensors include, for example, an accelerator sensor 42 configured to detect depression amount (hereinafter referred to as an □accelerator operation amount□) of an accelerator pedal 41 as an accelerator operation member, a brake sensor 44 configured to detect stepping operation amount (hereinafter referred to as a □brake operation amount□) of a brake pedal 43, and a rotational speed sensor (corresponding to a rotational speed detection unit) 45 configured to detect the rotational speed of the rotary shaft 13 of the engine 10. Detection signals from these sensors are sequentially input to the ECU 30. Note that other sensors than these sensors are provided in the present system, but are not shown in the figures.

The ECU 30 performs, based on a detection result of each sensor etc., control such as control for the amount of fuel injected by the fuel injection valve and control for ignition by the ignition device.

Moreover, the ECU 30 automatically stops the engine 10 in a case where predetermined automatic stop conditions are satisfied while a vehicle is travelling. The engine 10 is automatically restarted in a case where predetermined restart conditions are satisfied in a state in which the fuel is being cut (an automatic stop process) or the engine 10 has been automatically stopped. Note that the automatic stop conditions include, for example, a condition that a vehicle speed is equal to or lower than a predetermined speed, and a condition that the accelerator operation amount detected by the accelerator sensor 42 is zero (or the brake operation amount detected by the brake sensor 44 is greater than a first predetermined amount). Moreover, the engine restart conditions include, for example, a condition that the accelerator operation amount detected by the accelerator sensor 42 is greater than a second predetermined amount, and a condition that the brake operation amount detected by the brake sensor 44 is zero.

In a situation where a period until the predetermined restart conditions are satisfied after the predetermined automatic stop conditions have been satisfied is short, such as a case where the vehicle turns at an intersection, it is assumed that the engine rotational speed is not zero when the predetermined restart conditions are satisfied. Typically, in this case, a restarting method is changed according to the level of the engine rotational speed.

Specifically, in a case where the engine rotational speed upon satisfaction of the predetermined restart conditions is within a first predetermined rotational speed range, the engine 10 is restarted only by resuming fuel injection by the fuel injection valve. In a case where the engine rotational speed upon satisfaction of the predetermined restart conditions is within a second rotational speed range where the lower limit of the first rotational speed range is set as an upper limit, the rotating electrical machine 20 is driven as the electric motor to restart the engine 10. In a case where the engine rotational speed upon satisfaction of the predetermined restart conditions is within a third rotational speed range where the lower limit of the second rotational speed range is set as an upper limit, cranking by the starter motor 11 is started to increase the engine rotational speed to a second predetermined rotational speed. Thereafter, the engine rotational speed is further increased by the rotating electrical machine 20 while cranking by the starter motor 11 is terminated. Such cooperative start-up control by the starter motor 11 and the rotating electrical machine 20 will be described later again with reference to the figures.

For properly driving the rotating electrical machine 20 as the electric motor, the rotational angle of the rotor included in the motor 21 needs to be accurately recognized. Thus, a rotational angle sensor configured to detect the rotational angle of the rotor is often provided at the rotating electrical machine. On this point, in a case where no rotational angle sensor is provided as in the rotating electrical machine 20 according to the present embodiment, the rotational angle of the rotor needs to be estimated. Note that in the method for estimating the rotational angle of the rotor described in the present embodiment, it is assumed that in a case where the engine rotational speed is low, the inductive voltage and the inverse electromotive force generated at the rotor or the stator decrease, and accordingly, accuracy for estimating the rotational angle of the rotor is lowered. In this case, there is a probability that the rotating electrical machine 20 cannot be properly driven depending on the degree of lowering of the accuracy for estimating the rotational angle of the rotor. As a countermeasure, the lower limit of the engine rotational speed at which the rotating electrical machine 20 might not be able to be properly driven due to lowering of the accuracy for estimating the rotational angle of the rotor is set as a threshold, and the rotation detection unit 23 does not estimate the rotational angle of the rotor in a state in which the engine rotational speed is lower than the estimation threshold.

Meanwhile, a predetermined rotational speed (corresponding to the upper limit of the third rotational speed range described above) is provided as the upper limit of the engine rotational speed at which driving of the starter motor 11 can be started. When cranking by the starter motor 11 is started in a state in which the engine rotational speed is high, there is a probability that the pinion 12 may be worn when the solenoid 15 included in the starter motor 11 pushes the pinion 12 to engage the pinion 12 with the ring gear 14. Thus, the predetermined rotational speed is set as the upper limit of the engine rotational speed at which wear of the pinion 12 can be reduced when driving of the starter motor 11 is started.

In light of above, a situation where the estimation threshold is set higher than the predetermined rotational speed is assumed. In this situation, in a case where the engine rotational speed upon satisfaction of the predetermined restart conditions is within a range from the estimation threshold to the predetermined rotational speed, the rotational angle of the rotor is not estimated, and therefore, the rotating electrical machine 20 is not driven as the electric motor. Moreover, cranking by the starter motor 11 is not performed. On the other hand, by driving the rotating electrical machine 20 as the generator from the point of time of satisfaction of the predetermined automatic stop conditions, a load is applied to the rotary shaft 13 of the engine 10 and it is possible to increase the rate of decrease in the engine rotational speed. Accordingly, a load is provided to the rotary shaft 13 of the engine 10, and the rate of decrease in the engine rotational speed increases. In this manner, the load can be provided to the rotary shaft 13 of the engine 10, and the rate of decrease in the engine rotational speed can be increased. Thus, a period for which the engine rotational speed is within the range from the estimation threshold to the predetermined rotational speed can be shortened, and cranking by the starter motor 11 can be performed earlier.

Figure 2:
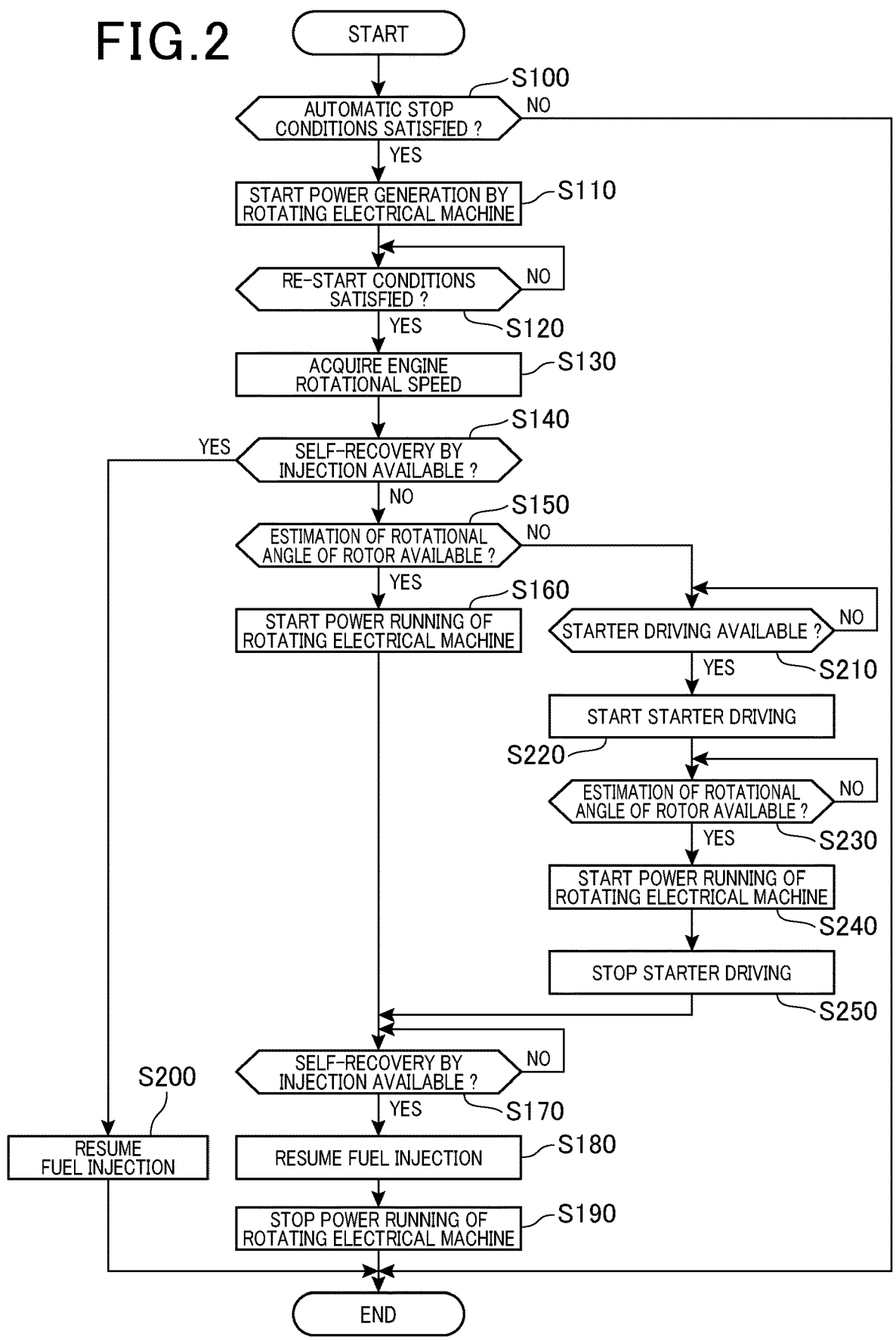
FIG. 2 is a flowchart of control executed by an ECU according to the present embodiment.

In the present embodiment, restart control illustrated in FIG. 2 is executed by the ECU 30. The restart control illustrated in FIG. 2 is repeatedly executed in a predetermined cycle by the ECU 30 during a period for which the ECU 30 is powered ON.

First, at step S100, it is determined whether or not the predetermined automatic stop conditions are satisfied. In a case where it is determined that the predetermined automatic stop conditions are not satisfied (S100: NO), the present control ends. In a case where it is determined that the predetermined automatic stop conditions are satisfied (S100: YES), the processing proceeds to step S110 to provide an instruction for driving the rotating electrical machine 20 as the generator to the control IC 22. Then, the processing proceeds to step S120.

At step S120, it is determined whether or not the predetermined restart conditions are satisfied. In a case where it is determined that the predetermined restart conditions are not satisfied (S120: NO), step S120 is performed again. In a case where it is determined that the predetermined restart conditions are satisfied (S120: YES), the processing proceeds to step S130 to acquire the engine rotational speed from the rotational speed sensor 45. Then, the processing proceeds to step S140.

At step S140, it is determined whether or not the engine rotational speed acquired from the rotational speed sensor 45 is higher than the lower limit of the first rotational speed range and the engine 10 can be restarted by resuming fuel injection by the fuel injection value. In a case where it is determined that the engine rotational speed is higher than the lower limit of the first rotational speed range and the engine 10 can be restarted by resuming fuel injection by the fuel injection value (S140: YES), the processing proceeds to step S200. At step S200, fuel injection by the fuel injection valve is resumed after an instruction for terminating power generation by the rotating electrical machine 20 has been provided to the control IC 22, and the present control ends. In a case where it is determined that the engine rotational speed is lower than the lower limit of the first rotational speed range and the engine 10 cannot be restarted even by resuming fuel injection by the fuel injection value (S140: NO), the processing proceeds to step S150.

At step S150, it is determined whether or not the engine rotational speed is higher than the estimation threshold and the rotational angle of the rotor can be estimated by the rotation detection unit 23. In a case where it is determined that the engine rotational speed is higher than the estimation threshold and the rotational angle of the rotor can be estimated by the rotation detection unit 23 (S150: YES), the processing proceeds to step S160. At step S160, an instruction for terminating power generation by the rotating electrical machine 20 and driving the rotating electrical machine 20 as the electric motor based on the rotational angle of the rotor estimated by the rotation detection unit 23 is provided to the control IC 22, and the processing proceeds to step S170.

At step S170, it is determined whether or not the engine rotational speed is higher than the lower limit of the first rotational speed range and the engine 10 can be restarted by resuming fuel injection by the fuel injection valve. In a case where it is determined that the engine rotational speed is still lower than the lower limit of the first rotational speed range and the engine 10 cannot be restarted even by resuming fuel injection by the fuel injection valve (S170: NO), step S170 is performed again. In a case where it is determined that the engine rotational speed is higher than the lower limit of the first rotational speed range and the engine 10 can be restarted by resuming fuel injection by the fuel injection valve (S170: YES), the processing proceeds to step S180. At step S180, fuel injection by the fuel injection valve is resumed. At step S190, an instruction for terminating driving of the rotating electrical machine 20 as the electric motor is provided to the control IC 22, and the present control ends.

In a case where it is determined that the engine rotational speed is lower than the estimation threshold and the rotational angle of the rotor is not estimated by the rotation detection unit 23 (S150: NO), the processing proceeds to step S210. At step S210, it is determined whether or not the engine rotational speed is lower than the predetermined rotational speed and cranking by the starter motor 11 can be performed. In a case where it is determined that the engine rotational speed is higher than the predetermined rotational speed and cranking by the starter motor 11 cannot be performed (step S210: NO), step S210 is performed again. In a case where it is determined that the engine rotational speed is lower than the predetermined rotational speed and cranking by the starter motor 11 can be performed (step S210: YES), the processing proceeds to step S220.

At step S220, cranking by the starter motor 11 is performed after an instruction for terminating power generation by the rotating electrical machine 20 has been provided to the control IC 22. At step S230, it is determined whether or not the engine rotational speed is higher than the estimation threshold and the rotational angle of the rotor can be estimated. In a case where it is determined that the engine rotational speed is still lower than the estimation threshold and the rotational angle of the rotor is not going to be estimated (S230: NO), the processing proceeds to step S230 again. In a case where it is determined that the engine rotational speed is higher than the estimation threshold and the rotational angle of the rotor can be estimated (S230: YES), the processing proceeds to step S240. At step S240, an instruction for driving the rotating electrical machine 20 as the electric motor based on the rotational angle of the rotor estimated by the rotation detection unit 23 is provided to the control IC 22, and the processing proceeds to step S250. At step S250, cranking by the starter motor 11 is terminated, and the processing proceeds to step S170.

Figure 3:
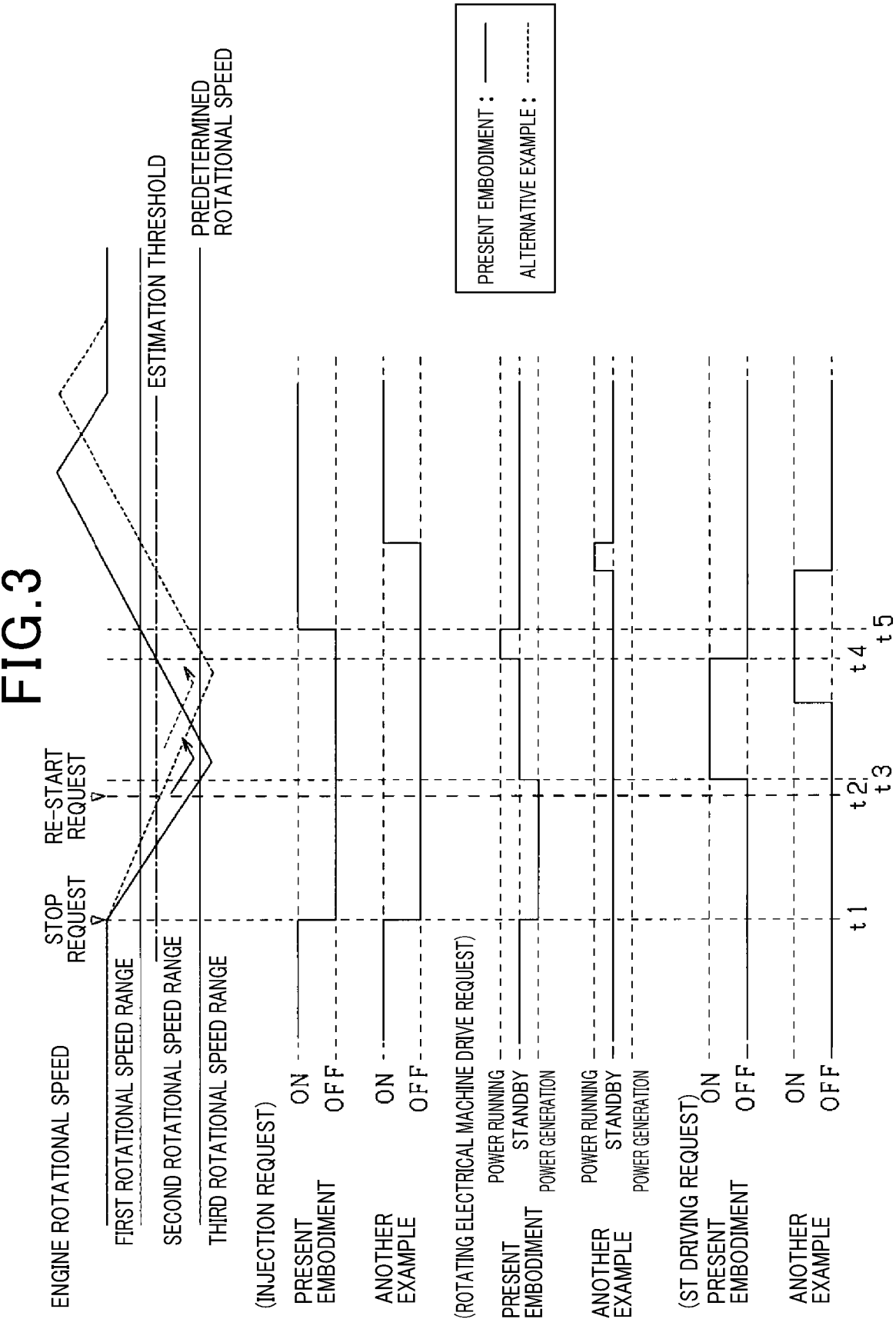
FIG. 3 is a time chart of operation of restart control according to the present embodiment.

Next, operation of the restart control executed by the ECU 30 will be described with reference to FIG. 3. Note that for this control operation, control contents of FIG. 2 will be described in chronological order.

Due to satisfaction of the predetermined automatic stop conditions during travelling of the vehicle, the rotating electrical machine 20 is driven as the generator (see a time t1). Accordingly, the load is provided on the rotary shaft 13 of the engine 10, and the rate of decrease in the engine rotational speed increases as indicated by a solid line. When the predetermined restart conditions are satisfied while the engine rotational speed is decreasing and the engine rotational speed at this point is within the range from the estimation threshold to the predetermined rotational speed, the rotating electrical machine 20 is not driven as the electric motor, and cranking by the starter motor 11 is not performed (see a time t2). Thus, even after the predetermined restart conditions have been satisfied, the engine rotational speed continuously decreases. When the engine rotational speed reaches below the predetermined rotational speed, power generation by the rotating electrical machine 20 is terminated, and cranking by the starter motor 11 is started (see a time t3).

The engine rotational speed increases to the estimation threshold by cranking of the starter motor 11, and thereafter, the rotating electrical machine 20 is driven as the electric motor based on the rotational angle of the rotor estimated by the rotation detection unit 23. Accordingly, the engine rotational speed further increases (see a time t4). At this point, cranking by the starter motor 11 is terminated. Then, when the engine rotational speed increases beyond the lower limit of the first rotational speed range, fuel injection by the fuel injection valve is resumed, and the engine 10 is restarted (see a time t5). At this point, driving of the rotating electrical machine 20 as the electric motor is terminated.

With the above-described configuration, the present embodiment provides the following advantageous effects.

In a case where the engine rotational speed upon satisfaction of the predetermined restart conditions is within the range from the estimation threshold to the predetermined rotational speed, no attempt is made to perform the control of increasing the engine rotational speed by means of the rotating electrical machine 20 and the starter motor 11 until the engine rotational speed falls below the predetermined rotational speed. Thus, the engine rotational speed falls below the predetermined rotational speed, and driving of the starter motor 11 is started under the condition where the engine rotational speed falls below the predetermined rotational speed. Consequently, in the rotating electrical machine 20 including no rotational angle sensor, proper engine restart control using the rotating electrical machine 20 and the starter motor 11 in combination can be performed.

In a case where the predetermined automatic stop conditions are satisfied, power generation by the rotating electrical machine 20 is performed. Thus, the rate of decrease in the engine rotational speed can be increased at an earlier stage. Consequently, a period until the engine 10 is actually restarted after the predetermined restart conditions have been satisfied can be shortened, and restart properties can be improved. Moreover, quick passage through a resonance rotational speed range where vibration might occur due to resonance of the engine 10 is allowed. Thus, vibration of the engine 10 can be reduced.

In a case where the engine rotational speed is lower than the predetermined rotational speed, power generation performed by the rotating electrical machine 20 since the predetermined automatic stop conditions have been satisfied is terminated. Thus, power generation by the rotating electrical machine 20 is terminated when cranking by the starter motor 11 is started, and therefore, the engine rotational speed can be smoothly increased.

The above-described embodiment can be changed as follows upon implementation.

In the above-described embodiment, the rotating electrical machine 20 includes the control IC 22 configured to control the rotating electrical machine 20. In this configuration, the ECU 30 may perform the control performed by the control IC 22, and the control IC 22 may be omitted. In this case, the configuration of the rotating electrical machine 20 can be simplified.

In the above-described embodiment, the rotation detection unit 23 estimates the rotational angle of the rotor from the induced voltage and the inverse electromotive force generated at the rotor or the stator. In this configuration, the rotation detection unit 23 may detect only the inductive voltage and the inverse electromotive force generated at the rotor or the stator, and the ECU 30 or the control IC 22 may estimate the rotational angle of the rotor based on the inductive voltage and the inverse electromotive force generated at the rotor or the stator and detected by the rotation detection unit 23.

In this case, in a state in which the engine rotational speed is higher than the estimation threshold, the rotation detection unit 23 detects the inductive voltage and the inverse electromotive force generated at the rotor or the stator, and the ECU 30 or the control IC 22 estimates the rotational angle of the rotor based on the inductive voltage and the inverse electromotive force generated at the rotor or the stator and detected by the rotation detection unit 23. On the other hand, in a state in which the engine rotational speed is lower than the estimation threshold, the rotation detection unit 23 does not detect the inductive voltage and the inverse electromotive force generated at the rotor or the stator, and neither the ECU 30 nor the control IC 22 estimates the rotational angle of the rotor. With this configuration, features and advantageous effects similar to those of the above-described embodiment are also provided.

Alternatively, the present restart control is also applicable to a configuration in which the rotation detection unit 23 constantly detects the inductive voltage and the inverse electromotive force generated at the rotor or the stator. Specifically, in a state in which the engine rotational speed is higher than the estimation threshold, the ECU 30 or the control IC 22 estimates the rotational angle of the rotor based on the inductive voltage and the inverse electromotive force generated at the rotor or the stator and detected by the rotation detection unit 23. On the other hand, in a state in which the engine rotational speed is lower than the estimation threshold, even when the rotation detection unit 23 detects the inductive voltage and the inverse electromotive force generated at the rotor or the stator, the ECU 30 or the control IC 22 does not estimate the rotational angle of the rotor. With this configuration, features and advantageous effects similar to those of the above-described embodiment are also provided.

In the method for estimating the rotational angle of the rotor according to the above-described embodiment, the rotational angle of the rotor is not estimated in a case where the engine rotational speed is lower than the estimation threshold upon satisfaction of the predetermined restart conditions. The present control may be performed for a configuration in which the rotation detection unit 23 cannot estimate the rotational angle of the rotor when the engine rotational speed reaches lower than a certain estimation threshold. With this configuration, features and advantageous effects similar to those of the above-described embodiment are also provided.

In a case where the ECU 30 or the control IC 22 estimates the rotational angle of the rotor, the present control may be similarly performed for a configuration in which the ECU 30 or the control IC 22 cannot estimate the rotational angle of the rotor when the engine rotational speed becomes lower than a certain estimation threshold.

In the above-described embodiment, in a case where the predetermined automatic stop conditions are satisfied, the rotating electrical machine 20 is driven as the generator. In this configuration, the rotating electrical machine 20 may be driven as the generator in a case where the engine rotational speed after satisfaction of the predetermined automatic stop conditions is lower than the estimation threshold, for example. With this configuration, the period until the engine 10 is actually restarted after the predetermined restart conditions have been satisfied can be also shortened, and the restart properties of the engine 10 can be also improved.

In the above-described embodiment, in a case where the predetermined automatic stop conditions are satisfied, the rotating electrical machine 20 is driven as the generator. In this configuration, the rotating electrical machine 20 is, as indicated by a dashed line of FIG. 3, not necessarily driven as the generator in a case where the predetermined automatic stop conditions are satisfied. In this case, in a case where the engine rotational speed upon satisfaction of the predetermined restart conditions is within the range from the estimation threshold to the predetermined rotational speed (see the time t2), no attempt is, as in the above-described embodiment, made to perform the control of increasing the engine rotational speed by means of the rotating electrical machine 20 and the starter motor 11 until the engine rotational speed falls below the predetermined rotational speed. Thus, the engine rotational speed falls below the predetermined rotational speed, and the cooperative start-up control by the starter motor 11 and the rotating electrical machine 20 can be performed. That is, in another example as described above, proper engine restart control using the rotating electrical machine 20 and the starter motor 11 in combination can be also performed.

In the above-described embodiment, in a case where the engine rotational speed is lower than the predetermined rotational speed, power generation performed by the rotating electrical machine 20 since the predetermined automatic stop conditions have been satisfied is terminated. In this configuration, in a case where the predetermined restart conditions are satisfied, power generation performed by the rotating electrical machine 20 since the predetermined automatic stop conditions have been satisfied may be terminated, for example.

The present disclosure has been described in association with the example embodiments, but it is understood that the present disclosure is not limited to the example embodiments and structures. The present disclosure also includes a variety of variations and variations in an equivalent scope. In addition, various combinations and forms and other combinations and forms including these various combinations and forms with only one component, more, or less also fall within the scope and sprit of the present disclosure.

What is claimed is:

1. A restart control system applied to a vehicle including an internal-combustion engine, a rotating electrical machine capable of performing power generation using torque transmitted from an output shaft of the internal-combustion engine and providing a rotation torque to the output shaft, a starter motor configured to start the internal-combustion engine, a rotational speed detection unit configured to detect a rotational speed of the internal-combustion engine, and an automatic stop restart control function for performing automatic stop and automatic restart of the internal-combustion engine, comprising:
   a rotational angle estimation unit configured to estimate a rotational angle of the rotating electrical machine in a state in which the rotational speed of the internal-combustion engine detected by the rotational speed detection unit is higher than an estimation threshold and configured not to estimate the rotational angle of the rotating electrical machine in a state in which the rotational speed of the internal-combustion engine is lower than the estimation threshold;
   a rotating electrical machine control unit configured to increase the rotational speed of the internal-combustion engine using the rotating electrical machine under a condition where a predetermined restart condition is satisfied and the rotational angle of the rotating electrical machine is estimated by the rotational angle estimation unit, thereby restarting the internal-combustion engine; and
   a starter motor control unit configured to start driving of the starter motor under a condition where the predetermined restart condition is satisfied and the rotational speed of the internal-combustion engine falls below a predetermined rotational speed set lower than the estimation threshold, thereby increasing the rotational speed of the internal-combustion engine to the estimation threshold.

2. The restart control system according to claim 1, wherein
   in a case where the predetermined restart condition is satisfied and the rotational speed of the internal-combustion engine detected by the rotational speed detection unit is within a range from the estimation threshold to the predetermined rotational speed, the rotating electrical machine control unit causes the rotating electrical machine to perform the power generation.

3. The restart control system according to claim 2, wherein
   in a case where the rotational speed of the internal-combustion engine falls below the predetermined rotational speed, the rotating electrical machine control unit terminates the power generation performed by the rotating electrical machine in a case where the predetermined restart condition is satisfied.

4. The restart control system according to claim 1, wherein
   in a case where a predetermined automatic stop condition is satisfied, the rotating electrical machine control unit causes the rotating electrical machine to perform the power generation.

5. The restart control system according to claim 4, wherein
   in a case where the rotational speed of the internal-combustion engine falls below the predetermined rotational speed, the rotating electrical machine control unit terminates the power generation performed by the rotating electrical machine in a case where the predetermined restart condition is satisfied.

6. The restart control system according to claim 1, wherein
   in a case where the rotational speed of the internal-combustion engine falls below the predetermined rotational speed, the rotating electrical machine control unit terminates the power generation performed by the rotating electrical machine in a case where the predetermined restart condition is satisfied.

7. A restart control system applied to a vehicle including an internal-combustion engine, a rotating electrical machine capable of performing power generation using torque transmitted from an output shaft of the internal-combustion engine and providing a rotation torque to the output shaft, a starter motor configured to start the internal-combustion engine, a rotational speed detection unit configured to detect a rotational speed of the internal-combustion engine, and an automatic stop restart control function for performing automatic stop and automatic restart of the internal-combustion engine, comprising:
   a rotational angle estimation unit configured to estimate a rotational angle of the rotating electrical machine and incapable of estimating the rotational angle of the rotating electrical machine in a state in which the rotational speed of the internal-combustion engine is lower than an estimation threshold;

a rotating electrical machine control unit configured to increase the rotational speed of the internal-combustion engine using the rotating electrical machine under a condition where a predetermined restart condition is satisfied and the rotational angle of the rotating electrical machine is estimated by the rotational angle estimation unit, thereby restarting the internal-combustion engine; and a starter motor control unit configured to start driving of the starter motor under a condition where the predetermined restart condition is satisfied and the rotational speed of the internal-combustion engine falls below a predetermined rotational speed set lower than the estimation threshold, thereby increasing the rotational speed of the internal-combustion engine to the estimation threshold.

8. The restart control system according to claim 7, wherein in a case where the predetermined restart condition is satisfied and the rotational speed of the internal-combustion engine detected by the rotational speed detection unit is within a range from the estimation threshold to the predetermined rotational speed, the rotating electrical machine control unit causes the rotating electrical machine to perform the power generation.

9. The restart control system according to claim 8, wherein in a case where the rotational speed of the internal-combustion engine falls below the predetermined rotational speed, the rotating electrical machine control unit terminates the power generation performed by the rotating electrical machine in a case where the predetermined restart condition is satisfied.

10. The restart control system according to claim 7, wherein in a case where a predetermined automatic stop condition is satisfied, the rotating electrical machine control unit causes the rotating electrical machine to perform the power generation.

11. The restart control system according to claim 10, wherein in a case where the rotational speed of the internal-combustion engine falls below the predetermined rotational speed, the rotating electrical machine control unit terminates the power generation performed by the rotating electrical machine in a case where the predetermined restart condition is satisfied.

12. The restart control system according to claim 7, wherein in a case where the rotational speed of the internal-combustion engine falls below the predetermined rotational speed, the rotating electrical machine control unit terminates the power generation performed by the rotating electrical machine in a case where the predetermined restart condition is satisfied.

\* \* \* \* \*